Feb. 11, 1969  O. HAGEN  3,427,082
BEARINGS
Filed Feb. 13, 1967
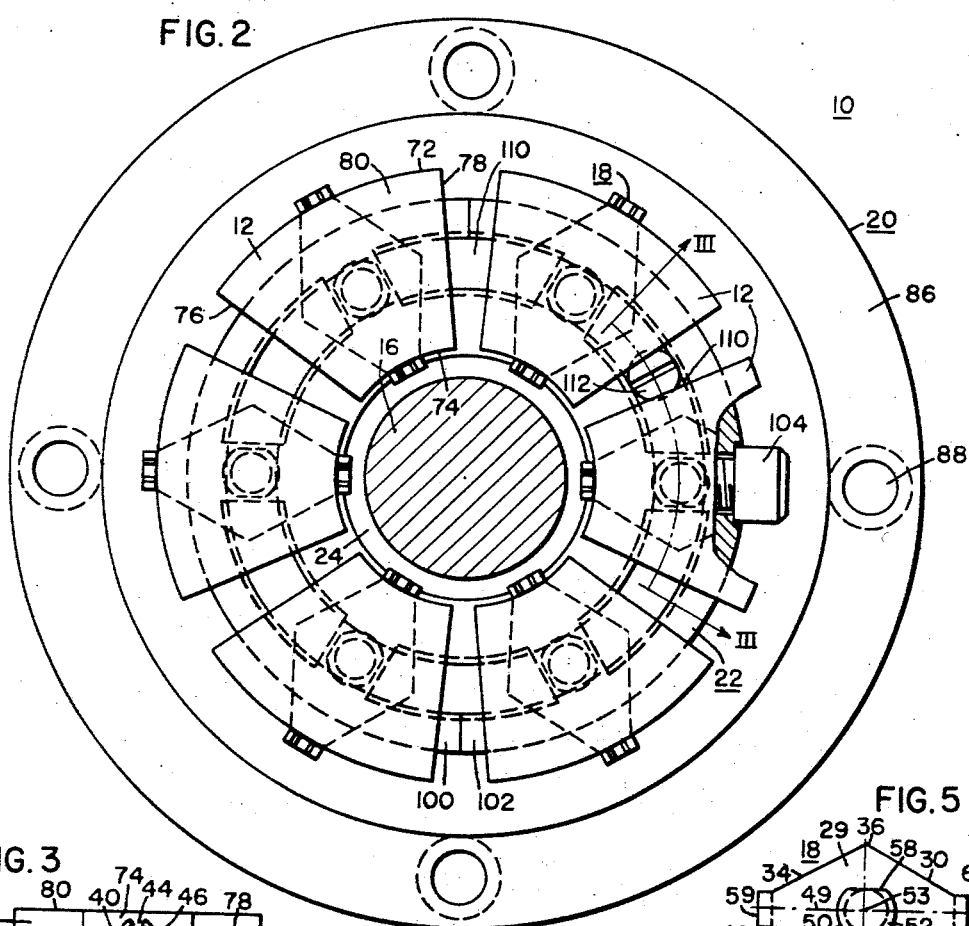
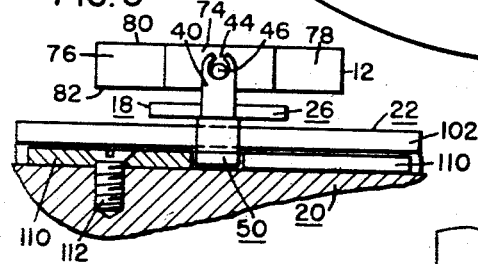
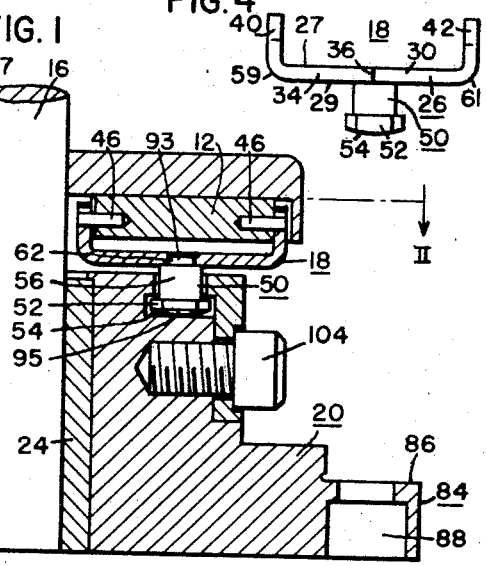
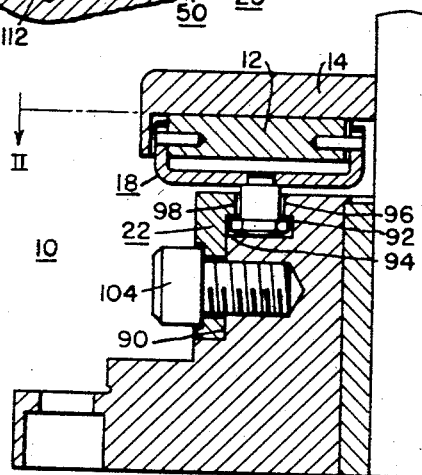

United States Patent Office 3,427,082
Patented Feb. 11, 1969

3,427,082
BEARINGS
Oskar Hagen, Greensburg, Pa., assignor to Westinghouse Electric Corporation, Pittsburgh, Pa., a corporation of Pennsylvania
Filed Feb. 13, 1967, Ser. No. 615,822
U.S. Cl. 308—26                    4 Claims
Int. Cl. F16c 27/02, 35/02, 17/10

ABSTRACT OF THE DISCLOSURE

A thrust bearing of the Kingsbury type, having a plurality of circumferentially spaced bearing shoes, each pivotally supported between two points on a spring-like mounting member. The mounting members allow circumferential and radial tilting of the bearing shoes, when they are mounted in a co-operating base ring assembly, and they have a substantially diamond-like or lozenge configuration which provides a constant blending resistance, to equalize the thrust among the plurality of shoes.

Background of the invention

The Kingsbury type thrust bearing requires that the individual bearing shoes be tangentially and radially tiltable, and they must also be allowed to move in a direction perpendicular to the plane of the thrust bearing. Thus, each shoe or thrust pad can tilt to establish the necessary wedge-shaped film of lubricating fluid, and they can seek a level, relative to the remaining shoes, which allows a substantially equal distribution of the thrust load.

In the prior art, the bearing shoes are commonly mounted on the spherical end of a crown pin, which provides the desired tilting action; and, the crown pin is disposed on a main link, which is in turn supported by two crown pins disposed on adjacent secondary links, which arrangement provides the desired relative motion between the shoes, perpendicular to the plane of the thrust bearing or collar. Or, the shoes are disposed on a crown pin, and the crown pins are all associated with a tiltable pressure distributing ring.

These prior art arrangements, while providing the desired performances, require the manufacture of a relative large number of co-operating parts, which have close tolerances, and thus are quite expensive. These arrangements also require a substantial amount of space in the direction perpendicular to the plane of the thrust bearing, which increases the length of the casing of the apparatus that the bearing is to be associated with.

Accordingly, it is an object of the invention to provide a new and less costly thrust bearing of the pivoted shoe type.

Another object of the invention is to provide a new and less costly thrust bearing of the pivoted shoe type, which provides a substantial equal distribution of thrust loads, without flexibly interconnecting the bearing shoes.

A further object of the invention is to provide a new and less costly thrust bearing of the pivoted shoe type, which provides the functions of tilting the shoes, and moving them individually relative to the plane of the thrust collar, with fewer parts, which have fewer critical dimensions and which require less space, than pivoted shoe thrust bearings of the prior art.

Summary of the invention

Briefly, the present invention accomplishes the above cited objects by providing a pivoted shoe type thrust bearing in which the means for holding each bearing shoe allows the shoes to perform all of the desired functions. The means for holding each shoe, which will be called the shoe mounting spring, includes a flat diamond or lozenge shaped metallic back portion, having two major opposed surfaces, a fixed crown or pivot pin which extends perpendicularly outward from the geometric center of one of its major surfaces, and two spaced pivot support structures which extend outwardly from oppositely disposed end portions of the remaining major surface of the diamond shaped back portion.

The crown pin of each of the shoe mounting springs is loosely secured in a dovetailed channel, which may be formed by a base ring and an encircling retaining ring, and the shoes are each pivotally supported by one of the shoe mounting springs to provide tangential tilting. The radial tilting of the shoes is provided by the curved shape on the head of the crown or pivot pin, which supports the shoe mounting spring in the dovetailed channel, and the relative movement of the shoe perpendicular to the thrust collar is provided by the flexing under load of the diamond shaped back portions of the spring. The diamond shape provides a constant bending resistance, which allows each bearing shoe to seek a position, relative to the remaining shoes, which equitably distributes the thrust load.

Brief description of the drawing

Further objects and advantages of the invention will become apparent from the following detailed description, taken in connection with the accompanying drawings, in which:

FIGURE 1 is an elevational view, in section, of a thrust bearing constructed according to the teachings of the invention, FIG. 2 is a plan view of the thrust bearing shown in FIG. 1, taken along the line II—II, FIG. 3 is an elevational view of a section of the thrust bearing shown in FG. 2, taken along the line III—III, FIG. 4 is a side elevational view of one of the shoe mounting spring members, constructed according to the teachings of the invention, and FIG. 5 is a bottom view of the shoe mounting spring shown in FIG. 4.

Description of preferred embodiments

Referring now to the drawings, in which like reference numerals in the various figures indicate like components, FIGURES 1 and 2 illustrate elevational and plan views, respectively, of a thrust bearing 10 of the pivoted shoe type, constructed according to the teachings of the invention. In general, thrust bearing 10 includes a plurality of spaced thrust pads or bearing shoes 12, which form non-rotating bearing surfaces, for cooperation with the rotating bearing surface of a thrust runner or collar 14, which may be fixed to a driving shaft 16. The shoes 12 are each pivotally mounted in a shoe mounting spring 18, with a pivot pin associated with each of the various mounting springs 18 being loosely secured in a dovetailed channel formed, in this instance, by cooperating base and retainer ring assemblies, 20 and 22, respectively.

Base ring assembly 20 may include a suitable bearing 24, the inner surface of which cooperates with the outer surface of shaft 16 to provide one of the radial bearing supports for shaft 16.

More specifically, instead of supporting each of the bearing shoes 12 on the curved end of a crown pin, which allows the shoe to pivot in any direction, the shoes 12 are each pivotally mounted in a shoe mounting spring 18, which eliminates the need of pivotally interconnecting the shoes and/or supporting the shoes on a separate pressure distributing or equalizer ring. As shown in detail in FIGS. 4 and 5 the shoe mounting spring 18 includes a metallic back portion 26, which has first and second major opposed surfaces 27 and 29, with the back portion 26 being formed in the shape of a parallelogram, diamond, or lozenge, which major surfaces are connected by first and second substantially parallel major sides 28 and 30, and third and fourth substantially parallel major sides 32 and 34. Major sides 30 and 34 meet to form a first "point" or corner 36 of the diamond shape, and sides 28 and 32 meet to form a second "point" or corner 38 of the diamond shape, disposed opposite to corner 36. While the sides are shown meeting in definite angles by shape corners 36 and 38, it will be understood that they may be curved or rounded if desired.

Sides 28 and 34 meet to form corner portion 59, at which point a shoe pivot support 40 extends perpendicularly outward from major surface 27 of back portion 26, and major sides 30 and 32 meet to form major corner portion 61, at which point a second shoe pivot support 42 extends perpendicularly outward from major surface 27 of back portion 26. Each of the shoe support extensions 40 and 42 include means for pivotally supporting a bearing shoe 12, such as a rounded channel or slotted end portion 44, as shown in FIGURE 3, which pivotally receives pins 46 secured to opposite sides of the bearing shoes 12, and which extend outwardly from the bearing shoes to cooperate with slotted ends 44 of the shoe supports 40 and 42.

The shoe mounting spring 18 is completed by securing a pivot or crown pin 50 to major surface 29 of back portion 26, which is opposite to the major surface 27 from which the shoe pivot supports extend. The center of pivot pin 50 substantially coincides with the geometrical center 53 of the back portion. The geometrical center 53 may be located by drawing a line 51 from corner 36 to corner 38, and a line 49 from corner 59 to corner 61. Imaginary lines 49 and 51 thus form first and second perpendicular axes for back portion 26, in which the corner portions 59 and 61, and the pivot points for the shoe 12, are in alignment with axis 49, and the remaining two corner portions 36 and 38 are in alignment with axis 51.

Thus, shoe mounting spring 18 includes a metallic back portion 26 having a first and second major opposed surfaces 27 and 29, which surfaces are connected by a first pair of oppositely disposed major side portions 28 and 30, and a second pair of oppositely disposed side portions 32 and 34, with the oppositely disposed side portions 28 and 30 being substantially parallel with one another, and with the oppositely disposed side portions 32 and 34 being substantially parallel with one another. All of the side portions 28, 30, 32, and 34 have substantially the same length. The major side portions intersect to form a first pair of oppositely disposed corner portions 59 and 61, and a second pair of oppositely disposed corner portions 36 and 38. The support means 40 and 42 for pivotally supporting bearing shoes 12 extend outwardly from the first major surface 27 of back portion 26, and they are fixed to the first pair of oppositely disposed corner portions 59 and 61, respectively. Pivot pin 50, which has first and second ends 93 and 95, extends outwardly from the second major surface 29 of back portion 26, and its first end 93 is fixedly attached to the back portion.

Pivot pin 50 has a head portion 52 at its second end 95, which includes a crowned or curved portion 54 at its extreme end. Pin 50 then steps inwardly to a smaller diameter surface 56 from head portion 52. It will be noted from FIGURES 4 and 5 that head portion 52 has two parallel flat portions 58 and 60 on opposite sides thereof, which reduce the dimension of the head portion in a direction perpendicular to the flat portions 58 and 60. Pivot pin 50 is secured to back portion 26 of shoe mounting spring 18, with the flat portions 58 and 60 being perpendicular to axis 51, and parallel with axis 49. Pivot pin 50 may be fixed to the back portion 26 by any suitable means, such as by welding or brazing. As shown in FIGURE 1, pivot pin 50 may include a still smaller diameter 62 at its end 93, which is sized to snugly enter an opening in back portion 26 of shoe mounting spring 18, with the end 93 being brazed to the portion of back 26 which defines the opening.

Thus, the shoe mounting spring 18 may be formed by first cutting the general diamond shape, along with two integral extending portions, from a flat sheet of a suitable metal, bending the extending portions to form the shoe pivot supports 40 and 42, drilling a hole at the geometrical center of the diamond shape, brazing a crown pin 50 into the hole, and cutting slots or channels 44 into the ends of the shoe supports 40 and 42.

The shoe mounting spring thus permits pivoting of its associated bearing shoe 12, in a first predetermined direction, by pivotally supporting the pins 46 which extend outwardly from the shoe 12, in the slots 44 provided in the ends of shoe supports 40 and 42, and as will be further explained, allows tilting of the shoe in a second direction by virtue of rounded end 54 on the head portion 52 of the pivot pin 50. Thus, each shoe may tilt into its own running position, to establish the desired wedge shaped film of lubricating fluid between itself and the mating thrust collar 14. The shoe mounting springs 18 also provide the very important function of allowing the shoes to move in a direction perpendicular to the plane of the bearing surface of thrust collar 14, and thus eliminate the very complicated arrangements of the prior art for accomplishing this function, which are costly to manufacture and assemble due to the large number of machined parts required, and which add substantially to the overall length of the bearing in a direction parallel to the axis 17 of shaft 16.

This self-leveling function of each shoe and its mounting support, which distributes the thrust load proportionately among the various bearing shoes 12, is performed by fabricating the shoe mounting spring 18 of a metal which has a relatively high yield strength, and a low modulus of elasticity, and by forming the back portion 26 of the mounting spring in a configuration which has a minimum width dimension at the shoe pivot support points 40 and 42, and a maximum width dimension at the point where the mounting spring is supported by pivot pin 50. In other words, the maximum width dimension occurs between corners 36 and 38, and the minimum width dimension, which is the direction parallel with axis 51, occurs at the shoe pivot points 40 and 42. Thus, the back portion 26 resembles a diamond configuration. This configuration will provide a spring of constant bending resistance, which is essential in order to insure that the mounting springs will equitably divide the thrust load. The actual angles used in the diamond configuration will depend upon the particular application, the thrust load, and the metal of which the mounting spring 18 is formed. The specific material of which mounting spring 18 is formed may be an aluminum bronze alloy, or any other material which will provide the desired spring characteristic. For example, successful mounting springs have been formed of a sheet of ASTM B 150–58, Alloy 2, with the thickness of the sheet being $5/32$ of an inch. The dimension between corners 36 and 38 was 1 inch, and the angles, such as angle 70 were 30°. ASTM B 150–58 is an aluminum bronze alloy containing 78 to 85% copper, 9 to 11% aluminum, 2 to 4% iron, 4 to 5.5% nickel, .25% maximum silicon, 1.5% maximum manganese, and 0.2% maximum tin. Any other suitable material having the desired spring characteristic may be used, however. The mounting spring 18, regardless of the material used, will be formed in the generally diamond shape, in order to provide the constant bending resistance necessary to achieve maximum deflection at a substantially constant thrust load.

After the shoe mounting springs 18 are formed, a bearing shoe 12 may be mounted in mounting spring 18 by disposing pins 46 in the slots 44 associated with shoe supports 40 and 42, and the slot fingers may be bent towards each other to secure the shoe in the proper position, without pinching the pins or otherwise restricting their pivotal association with the slots 46.

The bearing shoes 12 may be formed of any suitable bearing material, such as stellite, tungsten carbide, carbon graphite, and the like, and may be of one-piece construction, as shown in the figures, or they may be formed with a bearing insert as disclosed in United States Patent 2,874,007, issued Feb. 17, 1959, which is assigned to the same assignee as the present application. If the bearing shoes 12 are formed in one piece as shown in the figures, it is convenient to construct the shoes by cutting a circular shape having a first predetermined diameter from a sheet of the desired bearing material, cutting a circular portion from the center of the circular shape having a second predetermined diameter, and then cutting the resulting "washer" shaped piece into a plurality of substantially pie shaped pieces, on equally spaced lines which intersect the center of the inner and outer circles. Thus, as shown in FIGURE 2, each shoe has first and second curved side portions 72 and 74, respectively, first second straight side portions 76 and 78, respectively, and as shown in FIGURE 3, first and second major opposed surfaces 80 and 82, respectively. Surface 80 is finished to form the bearing surface. Curved sidewall portions 72 and 74 are then drilled on a common center line to a predetermined depth, and pins 46 are pressed therein.

Since the shoe mounting springs 18 and their associated bearing shoes 12 perform the desired functions of tilting the shoes, and moving the shoes in a direction perpendicular to the plane of the bearing surface of the thrust collar, the portion of the thrust bearing which holds the shoes and their mountings, may be relatively simple, and thus may be formed to facilitate easy assembly and disassembly of the shoes. The function of the remaining portion of the assembly is thus, primarily one of holding the shoe mounting springs 18 such that they are free to roll or rock slightly on the curved portion 54 of the crown pin 53. This holding function may be provided by a metallic base ring 20, which has an opening for receiving a sleeve type radial bearing 24 and shaft 16, and means 84 for mounting the thrust bearing 10, such as a flange 86 having a plurality of openings 88 therein for receiving suitable bolts (not shown). Base ring 20 has a surface 90 having a predetermined diameter, which surface receives retaining ring 22. Surface 90 steps inwardly to a smaller diameter surface 92, forming shoulder 94, against which the spherical portion 54 of the pivot pin 50 rests, and surface 92 steps outwardly for a short distance to surface 96, which step forms a flange for providing a portion of the dovetailed channel which pivotally secures the pivot pins 50 of the various shoe mounting spring asemblies 18.

The dovetailed mounting channel is completed by metallic retaining ring 22, which is a sleeve-like member having an inner surface which allows it to closely encompass surface 90 or base ring 20, and which has an inwardly extending flange or lip 98 on one end thereof, which forms the remaining portion of the dovetailed channel. In order to facilitate assembly of retaining ring 20, it should be cut into two substantially equal portions 100 and 102. The two portions 100 and 102 of the retainer ring may be secured to the base ring 20 by forming a plurality of openings through its wall portion, which mate with suitable threaded openings in base ring 20. A plurality of bolts 104 may then be used to hold the retaining ring 22 in assembled relation with the base ring 20.

In order to insure that the bearing shoes do not move out of their predetermined positions, relative to one another, and do not rotate in the mounting channel, the pivot pins 50 are spaced by a plurality of spacer members 110, which are disposed on shoulder 94. One of the spacer members is secured in place, such as by a flat-headed screw 112, which will then maintain the remaining spacers and shoe mounting spring assemblies in the desired circumferential relation. The spacers 110 are sized such that when they are all in place, and the pivot pins 50 are placed between the spacer member with the flat portions 58 and 60 on the head 52 of the pivot pin being parallel with the ends of the adjacent spacer members, that the pin 50 cannot rotate more than a few degrees. Spacer members 110 should not tightly squeeze the head portion 52, in order to allow pivot pin 50 to rock on shoulder 94 with its rounded head 54, to allow radial tilting of the shoe members. It will be noted from FIGURES 1 and 3 that the dovetailed channel does not tightly conform to the head of pin 50, which allows the desired radial rocking action of the shoes and their mounting assemblies, while still restricting the movement of the shoes and their mounting assemblies to a predetermined limit. It should be understood that retainer ring 22 may be eliminated by machining the dovetailed channel directly into base ring 20. The shoe mounting springs 18 would be inserted into the dovetailed channel by inserting the smaller dimension of head of pin 50 into the channel, and then rotate the pin and mounting spring 90°. Any suitable type of spacer members may then be inserted into the dovetailed channel and fixed thereto to maintain the desired positions of the mounting springs.

In assembling thrust bearing 10, the spacer member 110 with an opening therein should be placed on shoulder 94, with its opening aligned with the opening for receiving screw 112. Screw 112 may then be inserted to fix this spacer in position. The other spacer members may then be disposed on shoulder 94, and half of the shoes 12 and their mounting springs 18 may be placed with the head 52 of the pivot pins 50 disposed against shoulder 94. Portion 110 of retaining ring 22 may then be placed against surface 90 of base ring 20 and secured thereto by bolts 104, which will then also loosely hold the shoes and their mounting assemblies. The remaining shoes and their mounting assemblies may then be placed between the remaining spacers, and portion 100 of retainer ring 22 may be secured to base ring 20 with bolts 104. Bearing 24 may then be pressed, or shrunk into place, and shaft 16, along with thrust collar 14, may be placed in position, with the bearing surface of the thrust collar mating with the bearing surfaces of the bearing shoes.

Thus, in summary, there has been disclosed a new and less costly thrust bearing assembly 10. The number of parts to be manufactured has been substantially reduced, as the shoe assemblies are not flexibly interconnected, nor are equalizer rings, or other similar means, required for the purpose of distributing the thrust load among the various bearings. The substantially diamond shape of the back portion 26 of mounting spring 18 provides a constant bending resistance, when it bends about pin 50 in response to a downward thrust of pins 46 against shoe pivot supports 40 and 42. The reduced number of parts to be manufactured and assembled reduces the manufacturing costs, facilitates assembly of the thrust bearing during the manufacturing stage, and also facilitates disassembly of the bearing for maintenance in the field. Still further, by combining the tilting and load sharing function in one mounting spring, the overall axial length of the bearing is reduced, which reduces the overall length and cost of the associated apparatus, such as a pump. In some cases the shorter axial length promotes a shorter shaft overhang, which allows raising the critical speed, which is especially desirable in liquid metal pumps.

A thrust bearing, constructed according to the teachings of the invention, was tested using pressurized water as the lubricant. The bearing was operated satisfactorily in 150° F. water for 1500 hours, with 150 start-stops, while being subjected to an average thrust load of 40 p.s.i.

Since numerous changes may be made in the above described apparatus, and different embodiments of the invention may be made without departing from the spirit thereof, it is intended that all matter contained in the foregoing description or shown in the accompanying drawings, shall be interpreted as illustrative, and not in a limiting sense.

I claim as my invention:
1. A thrust bearing comprising,
a plurality of bearing shoes,
a plurality of mounting springs, each of said mounting springs including a substantially diamond shaped metallic back portion having first and second major opposed surfaces, first and second bearing shoe support means, and a pivot pin having first and second ends, said first and second shoe support means being fixed to two opposite corners, respectively, of said back portion, and extending outwardly from the first major surface of the back portion, the first end of said pivot pin being fixed to said back portion, with said pivot pin extending outwardly from the second major surface of said back portion,
each of said plurality of bearing shoes being pivotally secured by the first and second support means of one of said mounting springs,
means pivotally securing the second ends of the pivot pins of said plurality of mounting springs in spaced, circumferential relation,
and a thrust collar disposed to cooperate with the plurality of bearing shoes, and provide a thrust bearing in which the back portion of said mounting springs bends under a load applied to said plurality of bearing shoes by said thrust collar, to equally distribute the load among the plurality of bearing shoes.

2. The thrust bearing of claim 1 wherein the pivot pins are fixed to the geometric centers of the back portions of said mounting springs.

3. The thrust bearing of claim 2 wherein the second ends of the pivot pins includes a flanged head portion which has a rounded end, and the means for pivotally securing the second ends of the pivot pins includes a dovetailed channel, the flanged head of the pivot pins being pivotally secured in said dovetailed channel.

4. The thrust bearing of claim 3 inclluding spacer means disposed in said dovetailed channel, between the flanged heads of said pivot pins.

References Cited

UNITED STATES PATENTS

| 2,926,879 | 3/1960 | Dietrich | 248—284 X |
| 1,391,463 | 9/1921 | Dearborn | 308—160 |
| 3,170,114 | 2/1965 | Placke | 248—284 X |
| 3,246,936 | 4/1966 | Carle | 308—160 |

FOREIGN PATENTS 258,979  6/1949  Switzerland.

CARROLL B. DORITY, Jr., *Primary Examiner.*

U.S. Cl. X.R.

248—284; 308—160